(12) United States Patent
Kajiwara

(10) Patent No.: US 7,548,332 B2
(45) Date of Patent: Jun. 16, 2009

(54) NETWORK FACSIMILE APPARATUS, FACSIMILE COMMUNICATION SYSTEM, AND METHOD THAT CAN EFFICIENTLY TRANSPORT PACKETS

(75) Inventor: Tomohito Kajiwara, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 1264 days.

(21) Appl. No.: 10/437,139

(22) Filed: May 13, 2003

(65) Prior Publication Data

US 2004/0001224 A1   Jan. 1, 2004

(30) Foreign Application Priority Data

Jun. 21, 2002   (JP)   ............................ 2002-181119

(51) Int. Cl.
*G06F 15/00* (2006.01)
*H04L 12/56* (2006.01)

(52) U.S. Cl. ...................... 358/1.15; 358/442; 358/407; 379/100.09; 370/230; 370/235

(58) Field of Classification Search ................. 358/407, 358/442, 1.15, 425, 426.01, 426.02, 426.03, 358/426.08, 426.09, 426.1; 379/100.09; 370/395.52, 395.6, 241, 465; 714/774, 785
See application file for complete search history.

(56) References Cited

U.S. PATENT DOCUMENTS

| | | | | |
|---|---|---|---|---|
| 6,075,796 | A * | 6/2000 | Katseff et al. | 370/466 |
| 6,101,545 | A * | 8/2000 | Balcerowski et al. | 370/464 |
| 6,182,125 | B1 * | 1/2001 | Borella et al. | 370/234 |
| 6,233,249 | B1 * | 5/2001 | Katseff et al. | 370/466 |
| 6,259,538 | B1 * | 7/2001 | Amit et al. | 358/442 |
| 6,320,875 | B2 * | 11/2001 | Katseff et al. | 370/466 |
| 6,376,854 | B2 * | 4/2002 | Shishido et al. | 250/559.45 |
| 6,381,038 | B1 * | 4/2002 | Endo | 358/400 |
| 6,442,603 | B1 * | 8/2002 | Borella | 370/428 |
| 6,483,600 | B1 * | 11/2002 | Schuster et al. | 358/1.15 |
| 6,516,435 | B1 * | 2/2003 | Tsunoda | 714/751 |
| 6,522,429 | B2 * | 2/2003 | Endo | 358/400 |
| 6,563,599 | B1 * | 5/2003 | Whitfield | 358/1.15 |
| 6,798,767 | B1 * | 9/2004 | Alexander et al. | 370/352 |
| 6,940,819 | B2 * | 9/2005 | Kato | 370/237 |
| 6,956,860 | B1 * | 10/2005 | Colban | 370/401 |
| 7,050,187 | B1 * | 5/2006 | Fruth et al. | 358/1.15 |
| 7,088,677 | B1 * | 8/2006 | Burst, Jr. | 370/229 |

(Continued)

FOREIGN PATENT DOCUMENTS

JP   2001197279   7/2001

(Continued)

*Primary Examiner*—Kimberly A Williams
(74) *Attorney, Agent, or Firm*—Cooper & Dunham, LLP

(57) ABSTRACT

A network facsimile apparatus conforms to ITU-T Recommendation T.38 Standard and includes a function of transporting packet data by using one of TCP and UDP. A packet delay detection part detects a delay in packet transmission. A UDP/TCP selection part transports a succeeding packet of an address by using UDP in a case where the delay in a preceding packet of the same address is equal to or greater than a predetermined value when transporting the packet data by using TCP, and transports a succeeding packet of an address by using TCP in a case where the delay in a preceding packet of the same address is less than the predetermined value when transporting the packet data by using UDP.

10 Claims, 8 Drawing Sheets

U.S. PATENT DOCUMENTS

| | | | |
|---|---|---|---|
| 7,330,283 B2* | 2/2008 | Lee et al. | 358/1.15 |
| 2001/0030944 A1* | 10/2001 | Kato | 370/237 |
| 2002/0001373 A1* | 1/2002 | Sakurai | 370/352 |
| 2002/0101613 A1* | 8/2002 | Endo | 358/1.15 |
| 2003/0002476 A1* | 1/2003 | Chung et al. | 370/352 |
| 2003/0005387 A1* | 1/2003 | Tsunoda | 714/785 |
| 2003/0063324 A1* | 4/2003 | Takaoka | 358/404 |
| 2003/0193696 A1* | 10/2003 | Walker et al. | 358/402 |
| 2003/0223463 A1* | 12/2003 | Abrishami et al. | 370/516 |
| 2004/0111523 A1* | 6/2004 | Hall et al. | 709/230 |
| 2004/0218617 A1* | 11/2004 | Sagfors | 370/412 |
| 2005/0262251 A1* | 11/2005 | Klemets et al. | 709/230 |
| 2006/0155864 A1* | 7/2006 | Izumi | 709/230 |
| 2006/0227706 A1* | 10/2006 | Burst, Jr. | 370/229 |
| 2006/0262773 A1* | 11/2006 | Tanimoto | 370/351 |
| 2007/0229910 A1* | 10/2007 | Ulybin | 358/405 |
| 2008/0037420 A1* | 2/2008 | Tang | 370/229 |
| 2008/0094661 A1* | 4/2008 | Lee et al. | 358/1.15 |
| 2008/0151776 A1* | 6/2008 | Kure | 370/253 |
| 2008/0174826 A1* | 7/2008 | Fujino | 358/3.03 |

FOREIGN PATENT DOCUMENTS

JP  2001203746  7/2001

* cited by examiner

NETWORK FACSIMILE APPARATUS, FACSIMILE COMMUNICATION SYSTEM, AND METHOD THAT CAN EFFICIENTLY TRANSPORT PACKETS

BACKGROUND

1. Technical Field

This disclosure relates to facsimile communication systems, network facsimile apparatuses that conform to ITU-T Recommendation T.38 and can efficiently transport packets, and methods thereof.

2. Description of the Related Art

ITU-T Recommendations T.37 and T.38 are protocols for sending a facsimile signal over an IP network.

ITU-T Recommendation T.37 employs "Store and Forward" that temporarily spools facsimile data on an FOIP gateway. That is, facsimile data are temporarily stored in the memory of a gateway as TIFF image data, for example. Communication in the network layer (between gateways) is performed by another protocol. In a case where a mail transfer protocol (SMTP) is used for communication in the network layer, problems occur: the communication lacks real-time characteristics, negotiation among terminals (FAX machines) cannot be established, notification cannot be made to a network facsimile apparatus that is a transmitting source (sender) when transmission fails, and so on. On the other hand, ITU-T Recommendation T.38 is a real-time protocol and capable of causing terminals to directly exchange (transmit/receive) facsimile data between the terminals.

A facsimile signal may be sent over a VoIP (Voice over IP) network as an audio signal. VoIP is a technology of dividing voice into packets and transmitting the packets via a network, and uses an IP address as the address of the packets. There are two protocols, TCP (Transmission Control Protocol) and UDP (User Datagram Protocol), immediately above the IP level (network layer). In voice information transfer using VoIP, generally, data are transferred by using UDP/IP with the objective of ensuring real-time characteristics.

Basically, UDP only adds information relating to the application of a transmission destination (receiver) to the IP protocol, thus lacking reliability. Also, since UDP does not return a response at a protocol level, whether data are received at the transmission destination is unknown, and when an error occurs, the packet is simply discarded. When the transmission destination does not respond for four seconds, for example, a VoIP gateway proceeds to a retransmission process.

On the other hand, when TCP is used, the retransmission procedure is entrusted to a network. When facsimile data are sent using VoIP, however, delay in a data transfer process on the order of several seconds is not a problem. Accordingly, when VoIP is used for facsimile transfer, TCP is used together with VoIP.

By the way, TCP is a higher-level protocol (protocol having higher reliability in data transfer) than UDP. The process work load of TCP, however, is heavy since a retransmission process for a lost packet is performed after time out of the transmitting source, for example. Consequently, if the network traffic is increased, the packet transmission rate may be greatly reduced. Thus, when communication is established with a G3FAX (hereinafter referred to as a "GIIIFAX") via the VoIP gateway, there is a high probability that a T.30 timer times out due to delay.

On the other hand, in UDP, packet loss is avoided by adding redundant packets. Hence, since the packet size of (number of packets in) a transmission unit becomes large, there is a possibility that a receiving process of a terminal that receives packets is not completed in time.

BRIEF SUMMARY

In an aspect of this disclosure, there is provided a network facsimile apparatus capable of efficiently sending packets.

In another aspect of this disclosure, there is provided a network facsimile apparatus conforming to ITU-T Recommendation T.38 Standard and having a function of transporting data by using one of TCP and UDP, the network facsimile apparatus including:

a packet delay detection part detecting a delay in packet transmission; and a UDP/TCP selection part transporting a succeeding packet of an address by using UDP in a case where the delay in a preceding packet of the same address is equal to or greater than a predetermined value when transporting the packet data by using TCP, and transporting a succeeding packet of an address by using TCP in a case where the delay in a preceding packet of the same address is less than the predetermined value when transporting the packet data by using UDP.

Also, according to another aspect of this disclosure, there is provided a method of transporting packet data by using a network facsimile apparatus conforming to ITU-T Recommendation T.38 Standard and having a function of transporting the packet data by using one of TCP and UDP, comprising the steps of:

detecting a delay in packet transmission; and transporting a succeeding packet of an address by using UDP in a case where the delay in a preceding packet of the same address is equal to or greater than a predetermined value when transporting the packet data by using TCP, and transporting a succeeding packet of an address by using TCP in a case where the delay in a preceding packet of the same address is less than the predetermined value when transporting the packet data by using UDP.

According to the above-mentioned aspects, while facsimile transmission is performed by using TCP, when delay is increased and there is a possibility that a timer will time out, TCP is switched to UDP. Hence, even if traffic is concentrated (heavy), it is possible to efficiently transfer facsimile data.

In the case of T.38, when communication is made by using UDP, redundant packets are added so as to prevent packet loss. However, as described above, when the number of redundant packets is increased in order to raise the recovery level of packet loss, the packet size of (number of packets in) a transmission unit is increased. Consequently, there is a possibility that a receiving process of a terminal that receives packets is not completed in time.

Additionally, in the above-mentioned network facsimile apparatus, when transporting packet data by using UDP, according to the number of redundant packers included in a transmission unit, the transmission rate may be increased in a case where the number of the redundant packets is equal to or more than a predetermined value, and the transmission rate may be decreased in a case where the number of the redundant packets is less than the predetermined value. Hence, it is possible to prevent the disadvantage that the receiving process of the terminal that receives packets is not completed in time Since the process work load required in TCP is greater than that in UDP, when traffic is concentrated, the transmission rate is decreased. In a case where the priority of TCP/UDP with respect to a terminal is set with one-switch, if the default priority is set to TCP, it is impossible to select UDP transmission according to the network of a transmission destination to which a call is to be established.

In order to avoid such a disadvantage, whether priority is given to TCP or UDP may be registered to a one-touch dial or an abbreviated dialing number.

Additionally, in normal UDP transmission, redundant packets are added so as to prevent packet loss. However, also in facsimile communication, there is an error-free ECM (Error Correction Mode) and a protocol portion includes retransmission functions. That is, when redundant packets are provided in the ECM, two error recovery functions exist, which is not efficient. For such a reason, in the network facsimile apparatus according to the present invention, when transporting packet data by using UDP and in the ECM, the number of redundant packets may be set to zero.

In addition, according to another aspect of this disclosure, there is provided a facsimile communication system that includes:

a network facsimile apparatus conforming to ITU-T Recommendation T.38 Standard and having a function of transporting packet data by using one of TCP and UDP, said network facsimile apparatus including:

a packet delay detection part detecting a delay in packet transmission; and a UDP/TCP selection part transporting a succeeding packet of an address by using UDP in a case where the delay in a preceding packet of the same address is equal to or greater than a predetermined value when transporting the packet data by using TCP, and transporting a succeeding packet of an address by using TCP in a case where the delay in a preceding packet of the same address is less than the predetermined value when transporting the packet data by using UDP; and a facsimile apparatus receiving image data sent from said network facsimile apparatus, wherein, in a case where a lost packet that cannot be recovered with redundant packets occurs when transporting the packet data by UDP and in a non-ECM, communication is disconnected by the facsimile apparatus receiving the image data.

In a case where the number of redundant packets is not set to zero in UDP (in the case of non-ECM), if packets are lost successively, there is a possibility that packets cannot be recovered and packet loss occurs. In many cases, packet loss occurs in the phase of image data. In the case of a non-ECM, depending on a part where image data are lost, it is determined that normal reception is made even if a reception error should occur. For preventing such a disadvantage, in the network facsimile communication system according to the present invention, in a non-ECM UDP transmission conforming to T.38, in a case that packet loss occurs where packets cannot be recovered with redundant packets, the communication is disconnected (the call is released) by the transmission destination side.

According to this disclosure, when packet delay occurs in transportation using TCP, the succeeding packets are transported by using UDP. Thus, even if network work load is increased, it is possible to reduce the probability of occurrence of a T.30 timer times our due to the packet delay. Also, it is possible to select TCP/UDP in consideration of the network bandwidth of a transmission destination. Thus, it is possible to perform communication with less packet delay.

Even if the number of redundant packets is increased in UDP, it is possible for the transmission destination side (receiving side) to reduce the probability of occurrence of overflow in packet reception.

In addition, when transporting packet data by using UDP and ECM, it is possible to eliminate redundant packets. Hence, it is possible to reduce network work load.

Further, it is possible to prevent a user from misinterpreting that normal communication is made when an error is not signalled even though packet loss occurs.

Other aspects, features and advantages will become more apparent from the following detailed description when read in conjunction with the following drawings.

DETAILED DESCRIPTION OF THE PREFERRED EMBODIMENTS

Figure 1:
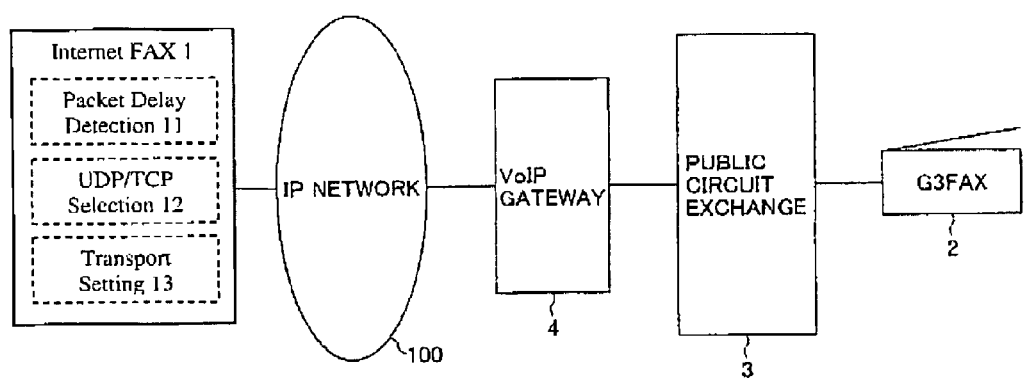
FIG. 1 is a schematic diagram showing a state where an Internet FAX is connected to a GIIIFAX via an IP network, a gateway, and an exchange.

In FIG. 1, an Internet FAX (network facsimile apparatus) 1 is connected to an IP network 100. In addition, a facsimile terminal apparatus (GIIIFAX) 2 is connected to the IP network 100 via an exchange 3 of a communication carrier and a VoIP gateway 4. The Internet FAX 1 conforms to ITU-T Recommendation T.38 Standard having a function of performing transport of data (packets) by either TCP or UDP.

The internet FAX 1 includes a packet delay detection part 11 as packet delay detection means detecting the amount of delay in packet transmission, a UDP/TCP selection part 12 as UDP/TCP selection means performing transport of the succeeding communication of the same address by UDP if the delay is equal to or greater than a predetermined value when transporting data by using TCP, and performing transport of the succeeding communication of the same address by TCP if the delay is less than the predetermined value when transporting data by using UDP, and a transport setting part 13 as transport setting means setting the priority of TCP/UCP for each address as the parameter of a one-touch dial or an abbreviated dialing number.

Figure 2:
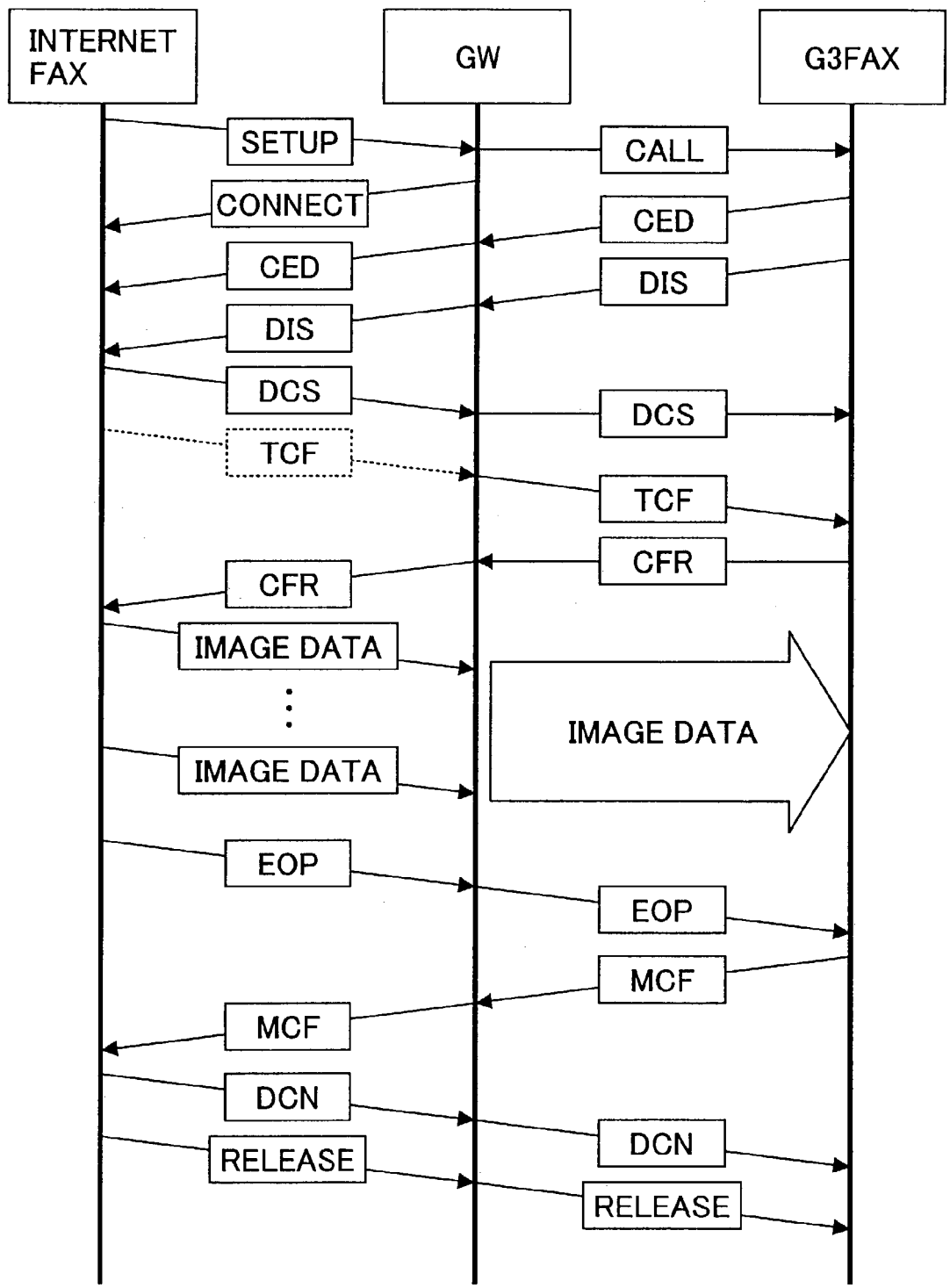
FIG. 2 is a sequence diagram showing a communication sequence among the Internet FAX, the gateway, and the GIIIFAX that are shown in FIG. 1.

FIG. 2 is a sequence diagram showing a communication sequence among the Internet FAX 1, the gateway (GW) 4, and the GIIIFAX 2, which are shown in FIG. 1. Here, it is assumed that a transport layer is set to TCP by default. That is, the UDP/TCP selection part 12 selects TCP by default and performs communication using TCP/IP.

The packet delay detection part 11 detects delay in a packet by recording reception of response from a command of a signal packet that serves as the response to a command such as DIS-DCS and postmessage, for example, EOP-MCF in FAX communication. When the value of the delay is equal to or greater than a predetermined time duration (four seconds, for example), the next communication with the same address is performed while giving priority over UDP. In other words, the UDP/TCP selection part 12 selects UDP and perform communication using UDP/IP. Thus, even if the network work load is increased, the probability that a T.30 timer times out due to delay is reduced.

Figure 3A:
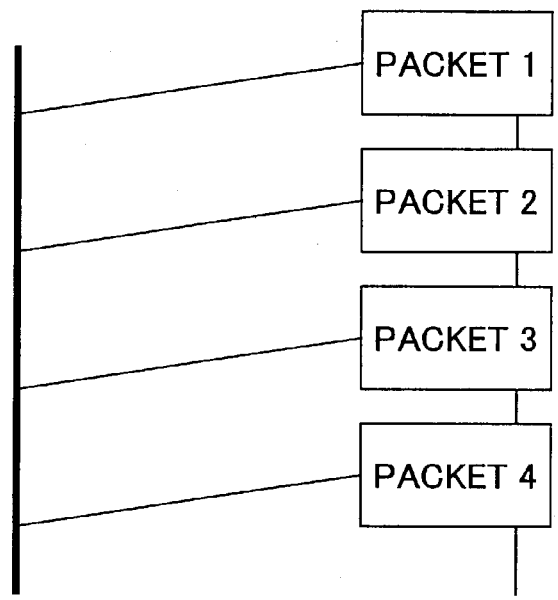
FIG. 3A is a schematic diagram showing transmission where an error occurs when packet loss occurs.
Figure 3B:
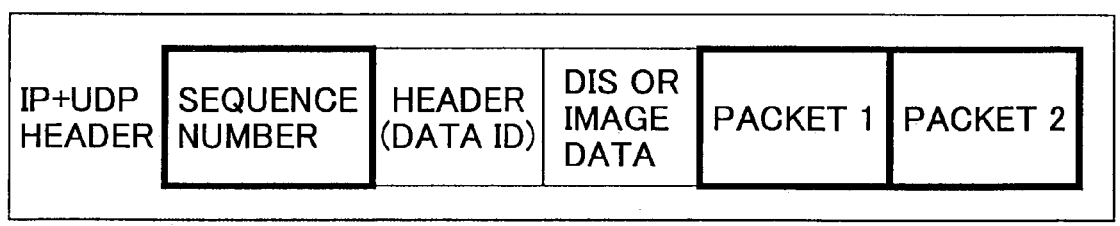
FIG. 3B is a schematic diagram showing a packet format (structure) in UDP where redundant packets are added.

In UDP, there is no guarantee for the order (alignment) of packets and for packets lost. Therefore, if packet loss occurs when transmission as shown in FIG. 3A is performed, an error occurs. For this reason, in UDP/IP, packets are sent by adding redundant packets thereto so as to form a packet format (structure) as shown in FIG. 3B.

Figure 4:
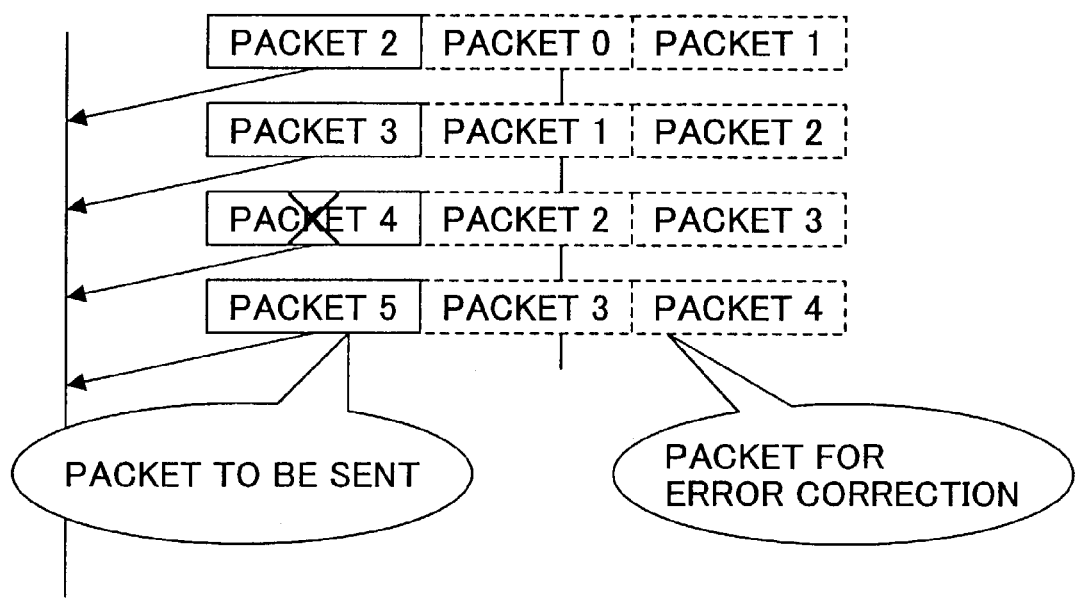
FIG. 4 is a schematic diagram for explaining transmission where latest packets sent are added for securing sequence numbers for reassembling the packets sent and for error recovery of packet loss.

In other words, as shown in FIG. 4, the transmission packets are sent by adding latest packets sent (packets that are already sent) thereto for securing sequence numbers for reassembling the packets sent and error recovery of packet loss. In FIG. 4, redundant packets are shown with broken lines.

For example, when a packet 4 (the packet that is crossed out in FIG. 4) is lost, error recovery is performed by using a packet 4 for error correction that is added to and sent with a packet 5.

In the present invention, the priority transport setting part 13 sets whether priority is to be given to TCP or UDP for each address as the parameter of the one-touch dial or the abbreviated dialing number.

Figure 5:
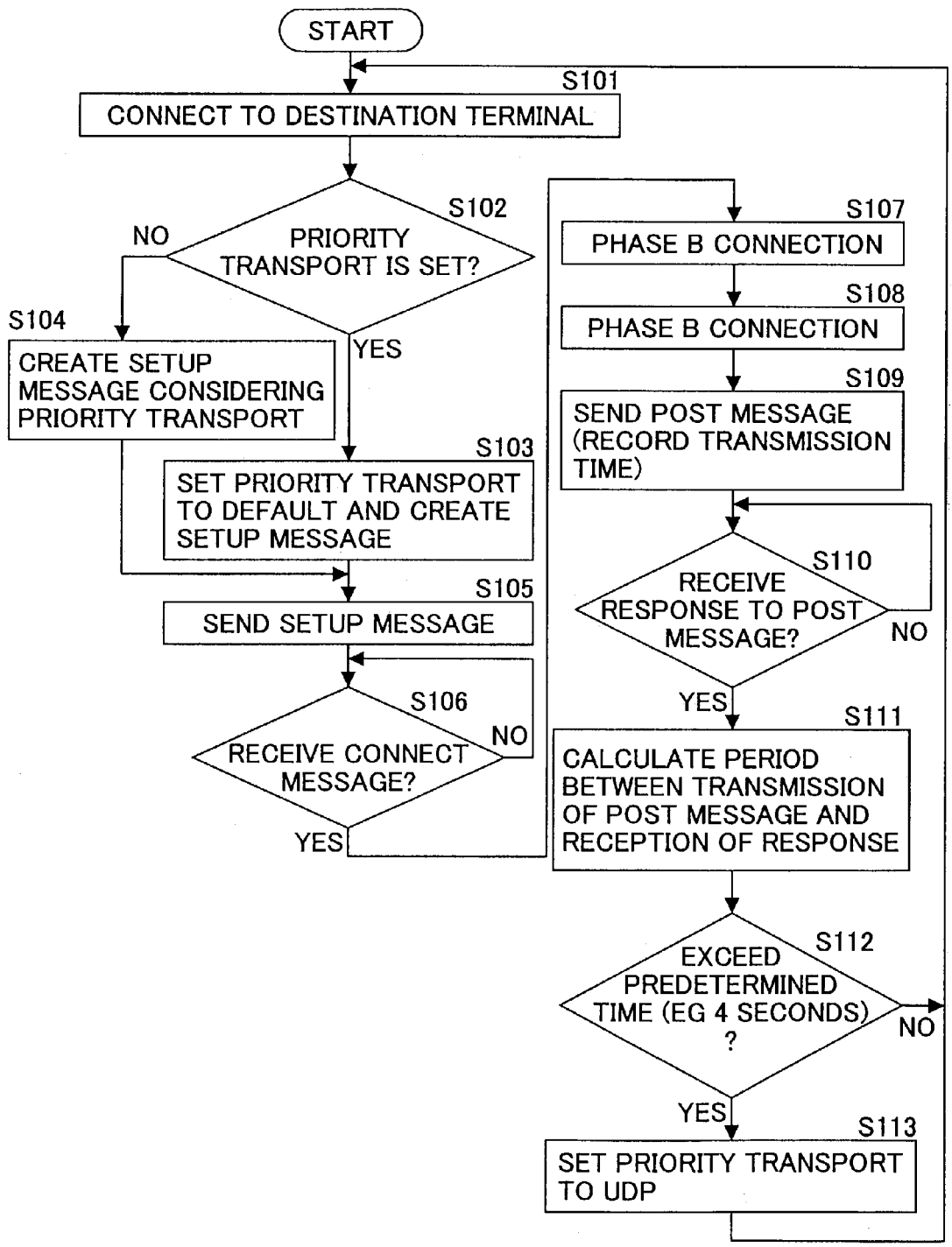
FIG. 5 is a flow chart for explaining a process where the Internet FAX reads the selection parameter of a one-touch dial or an abbreviated dialing number in establishing a call, varies the arrangement order of OLC for data channels of a SETUP message, and sends a request of TCP/UDP of the transmitting source side to the transmission destination side.

When establishing a call, the Internet FAX 1 reads the parameter of the one-touch dial or the abbreviated dialing number, varies the arrangement of OLC for data channel of a SETUP message, and sends a request of the transmitting source (sender) to a transmission destination (receiver). Hence, it is possible to select either TCP/UDP for each address in consideration of the network bandwidth of the transmission destination. Thus, it is possible to perform communication with less packet delay. FIG. 5 shows the process of the Internet FAX 1 on this occasion.

First, in step S101, a connection is established with a terminal to be connected (destination terminal)(GIIIFAX2). In step S102, it is determined whether or not the priority transport is set with respect to the address of the destination terminal by the priority transport setting part 13. When the priority transport is set (YES in step S102), the priority transport is set to a default setting and a SETUP message is created in step S103. Then, in step S105, the SETUP message is sent. On the other hand, when the priority transport is not set (NO in step S102), in step S104, the SETUP message is created in consideration of the priority transport. Thereafter, the SETUP message is sent in step S105.

After the SETUP transmission (step 5105), whether or not a CONNECT message is received is determined in step S106. Step S106 is repeated until the decision result becomes YES. After receiving the CONNECT message (YES in step S106), phase B connection is made in steps S107 and S108. In step S109, a POST message is sent and the transmission time thereof is recorded. Then, in step S110, it is determined whether or not a response to the POST message is received. Step S110 is repeated until the decision result becomes YES. When the response to the POST message is received (YES in step S110), the period (time difference) between the transmission of the POST message and the reception of the response is calculated in step S111.

In step S112, it is determined whether or not the time difference between the transmission of the POST message and the reception of the response is equal to or more than a predetermined value (for example, four seconds). When the time difference between the transmission of the POST message and the reception of the response is equal to or more than the predetermined value (YES in step S112), the priority transport is set to UDP in step S113, and the process returns to step S101. On the other hand, when the time difference between the transmission of the POST message and the reception of the response is less than the predetermined value (NO in step S112), the process directly returns to step S101.

Figure 6:
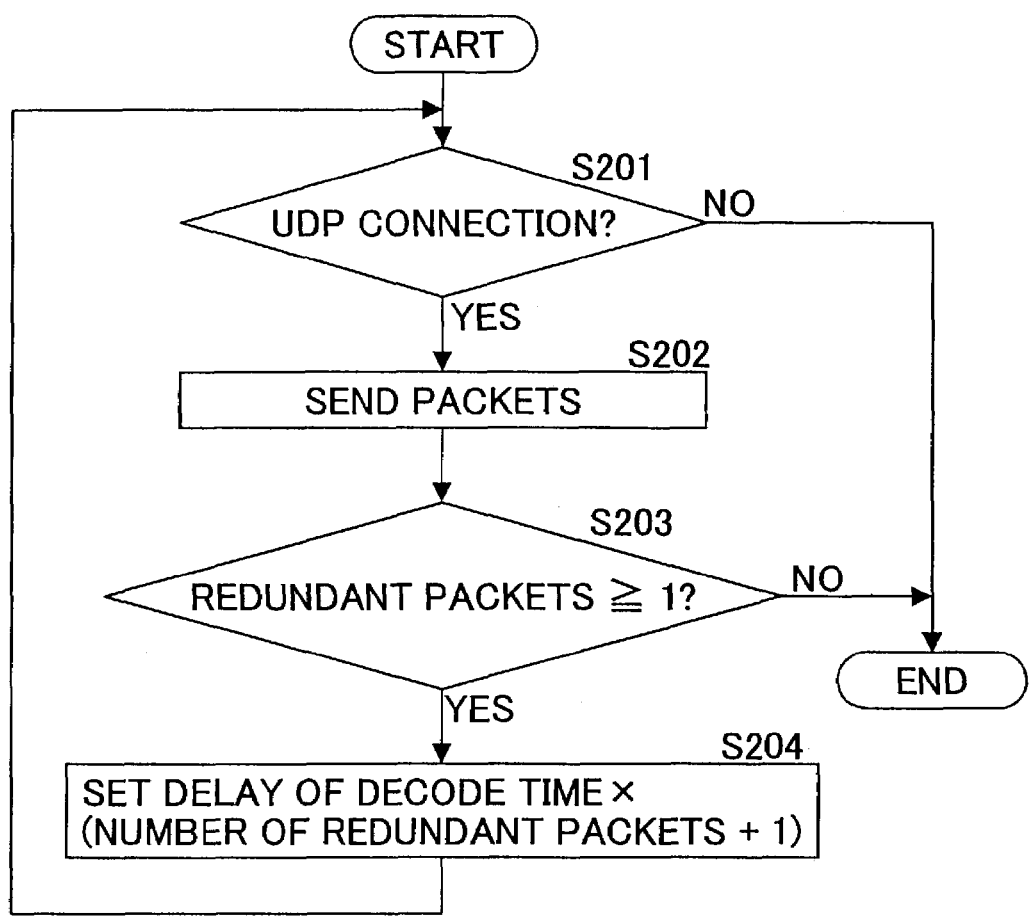
FIG. 6 is a flow chart for explaining a process where delay having the number of redundant packets as its coefficient is inserted between transmission packets of image data.

As described above, according to the T.38 Standard, when communication is established using UDP/IP, in order to avoid packet loss, the redundant packets as shown with the broken lines in FIG. 4 are added. When the number of redundant packets is increased so as to raise the recovery level of packet loss, the packet size of (number of packets in) a transmission unit is increased. Delay using the number of the redundant packets as its coefficient is inserted between transmission packets of image data. With the delay, packet decoding is made processable. FIG. 6 shows this delay insertion process.

First, in step S201, it is determined whether UDP transport or TCP transport is being performed. When TCP transport is being performed (NO in step S201), the process ends. When UDP transport is being performed (YES in step S201), packets (packets other than redundant packets) are sent in step S202. In step S203, it is determined whether or not the number of redundant packets is equal to or more than one. When the number of redundant packets is less than one (when there is no redundancy packet)(NO in step S203), the process ends. When the number of redundant packets is equal to or more than one (YES in step S203), a delay of "decode time x (the number of redundant packets +1)" is set in step S204. Then, the process returns to step S201. As described above, even if the number of redundant packets is increased in UDP, it is possible to control the probability that overflow occurs in packet reception on the receiving side to be low.

Figure 7:
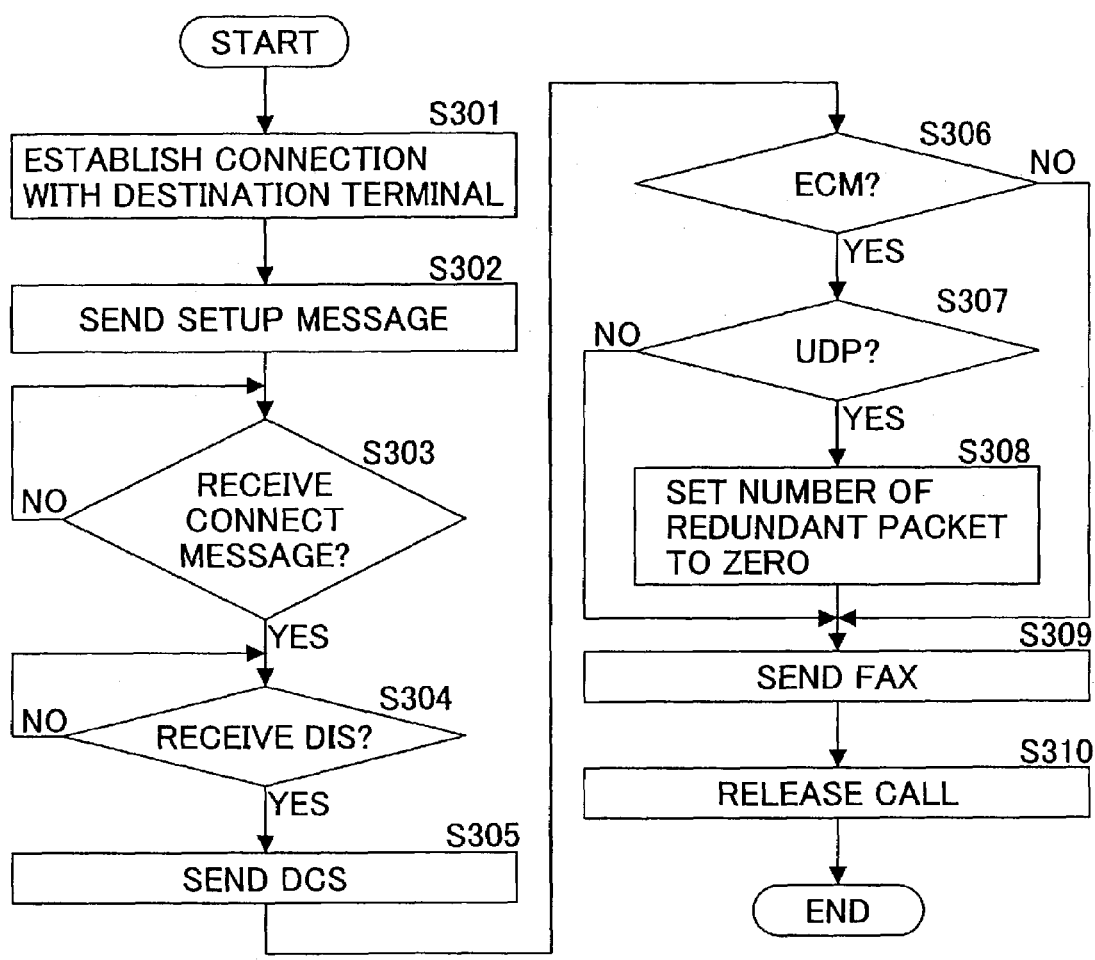
FIG. 7 is a flow chart for explaining a process of setting the number of redundant packets to zero when facsimile communication is performed in an ECM in transportation using UDP.

In the present invention, in UDP, when FAX communication is performed in an ECM (Error Correction Mode) through exchange of DIS/DCS, it is possible to set the number of redundant packets to zero. FIG. 7 shows the process of setting the number of redundant packets to zero.

First, a connection is established between the Internet FAX 1 and the destination terminal (GIIIFAX2) in step S301. Then, a SETUP message is sent to the destination terminal from the Internet FAX 1 in step S302. Subsequently, in step S303, whether or not the Internet FAX 1 receives a CONNECT message from the destination terminal is determined. Step S303 is repeated until the decision result becomes YES. When the Internet FAX 1 receives a CONNECT message from the destination terminal (YES in step S303), whether or not the Internet FAX 1 receives DIS from the destination terminal is determined in step S304. Step S304 is repeated until the decision result becomes YES. When the Internet FAX 1 receives DIS from the destination terminal (YES in step S304), the Internet FAX 1 sends DCS to the destination terminal in step S305. In step S306, whether or not the ECM transmission is performed is determined. When the ECM transmission is not performed (NO in step S306), the process proceeds to step S309. In step S309, communication (transmission by TCP or by UDP with redundant packets) is made. Then, in step S310, the call is released (communication is disconnected). On the other hand, when transmission is performed in the ECM (YES in step S306), in step S307, it is determined whether or not the transmission uses UDP. When the transmission does not use UDP (that is, transmission uses TCP: NO in step S307), the process proceeds to step S309, which is described above. When the transmission uses UDP (YES in step S307), the number of redundant packets is set to zero in step S308, and the process proceeds to step S309. As mentioned above, when UDP is used and transmission is in the ECM mode, redundant packets can be eliminated. Thus, it is possible to reduce network work load.

Figure 8:
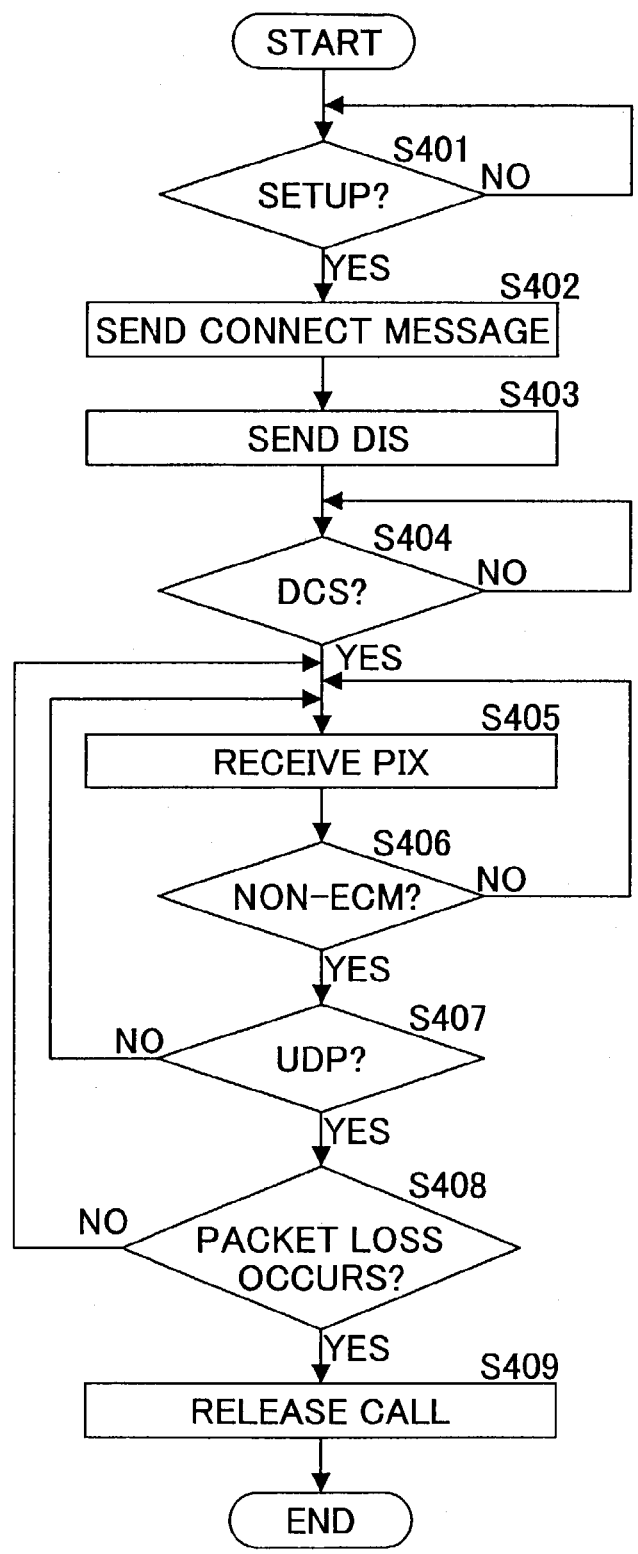
FIG. 8 is a flow chart for explaining a process where a GW releases a call.

In the present invention, when packet loss occurs in a case where FAX communication that is not in the ECM is performed through exchange of DIS/DCS, it is possible for the destination terminal to disconnect the communication (release the call). FIG. 8 shows the process where the (VoIP) GW 4 releases a call.

First, in step S401, it is determined whether or not the GW 4 receives a SETUP message. Thereafter, the GW 4 sends the CONNECT message and DIS in steps S402 and S403, respectively. In step S404, the GW 4 determines whether or not the DCS is received. Step S404 is repeated until the decision result becomes YES. When the DCS is received (YES in step S404), the process proceeds to step S405. In step S405, the GW 4 receives PIX. Then, in step S406, the GW 4 determines whether or not a non-ECM transmission is performed. When a non-ECM transmission is not performed (NO in step S406), the process returns to step S405. When a non-ECM transmission is performed (YES in step S406), in step S407, the GW 4 determines whether or not the transmission uses UDP. When transmission does not use UDP (NO in step s407), the process returns to step S405. When transmission uses UDP (YES in step S407), in step S408, the GW 4 determines whether or not packet loss occurs. When packet loss does not occur (NO in step S408), the process returns to step S405. When packet loss occurs (YES in step S408), the GW 4 releases the call in step S409 and the process ends. Hence, it is possible to prevent a user on the transmitting side from misinterpreting that normal communication can be made when no error is signalled, even though packet loss occurs.

The present invention is not limited to the specifically disclosed embodiments, and variations and modifications may be made without departing from the scope of the present invention.

The present application is based on Japanese priority application No. 2002-181119 filed on Jun. 21, 2002, the entire contents of which are hereby incorporated by reference.

What is claimed is:

1. A network facsimile apparatus configured to perform a facsimile communication by a Transmission Control Protocol (TCP) which executes a retransmission of facsimile data by waiting for a time-out at a transmitting end, or by a User Datagram Protocol (UDP) which adds an error correction data, said network facsimile apparatus comprising:
a transmitting part configured to transmit a predetermined command;
a receiving part configured to receive a response signal with respect to the predetermined command;
a detecting part configured to detect a time difference from a time when the predetermined command is transmitted by the transmitting part to a time when the response signal is received by the receiving part;
a comparing part configured to compare the time difference detected by the detecting part and a predetermined value and to obtain a comparison result; and
a determining part configured to determine whether to perform the facsimile communication by the TCP or by the UDP, based on the comparison result obtained by the comparing part.

2. The network facsimile apparatus as claimed in claim 1, wherein a delay is set depending on a number of redundant packets included in packets to be transmitted, when at least one redundant packet exists.

3. The network facsimile apparatus as claimed in claim 1, wherein a priority of the TCP over the UDP or vice versa is registered to one of a one-touch dial and an abbreviated dialing number.

4. The network facsimile apparatus as claimed in claim 1, wherein a number of redundant packets is set to zero when performing the facsimile communication by the UDP in an Error Correction Mode (ECM).

5. The network facsimile apparatus as claimed in claim 1, wherein reception is disconnected if a packet loss that is non-recoverable from a redundant packet occurs when performing the facsimile communication by the UDP in a non-Error Correction Mode (non-ECM).

6. A facsimile communication method for performing a facsimile communication by a Transmission Control Protocol (TCP) which executed a retransmission of facsimile data by waiting for a time-out at a transmitting end, or by a User Datagram Protocol (UDP) which adds an error correction data, said facsimile communication method comprising:
measuring a time difference from a time when a predetermined command is transmitted to a time when a response signal with respect to the predetermined command is received and
determining whether to perform the facsimile communication by the TCP or by the UDP, based on a comparison result of the measured time difference and a predetermined value.

7. The facsimile communication method as claimed in claim 6, further comprising:
setting a delay depending on a number of redundant packets included in packets to be transmitted, when at least one redundant packet exists.

8. The facsimile communication method as claimed in claim 6, further comprising:
registering a priority of the TCP over the UDP or vice versa to one of a one-touch dial and an abbreviated dialing number.

9. The facsimile communication method as claimed in claim 6, further comprising:
setting a number of redundant packets to zero when performing the facsimile communication by the UDP in an Error Correction Mode (ECM).

10. The facsimile communication method as claimed in claim 6, further comprising:
disconnecting reception if a packet loss that is non-recoverable by a redundant packet occurs when performing the facsimile communication by the UDP in a non-Error Correction Mode (non-ECM).

* * * * *